Feb. 13, 1968   A. E. RUDA   3,368,519
AUDIBLE SIGNAL FOR DISK BRAKES
Filed Sept. 28, 1964
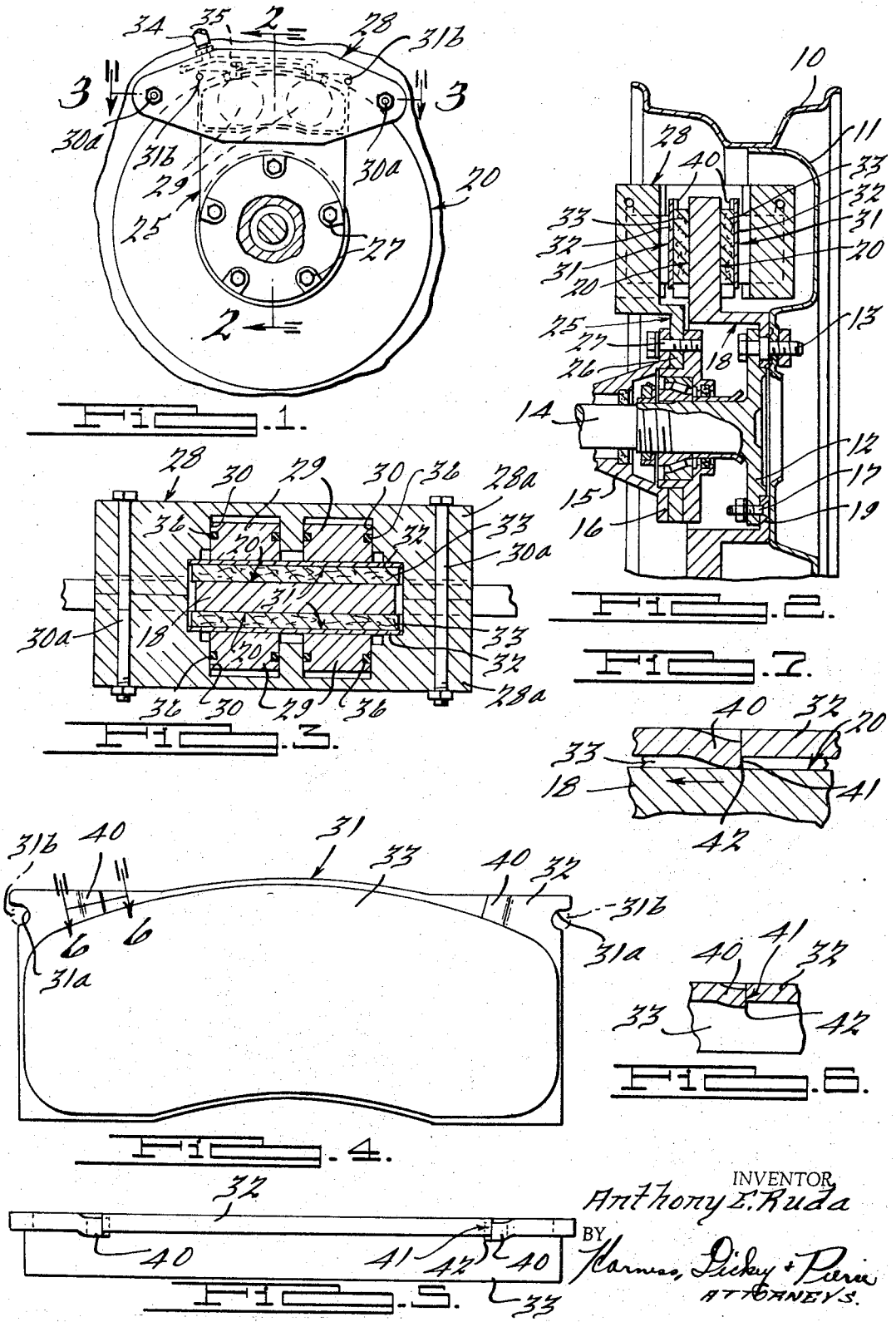
INVENTOR
Anthony E. Ruda
BY
Harness, Dickey & Pierce
ATTORNEYS

United States Patent Office 3,368,519
Patented Feb. 13, 1968

3,368,519
AUDIBLE SIGNAL FOR DISK BRAKES
Anthony E. Ruda, Detroit, Mich., assignor to Kelsey-Hayes Company, Romulus, Mich., a corporation of Delaware
Filed Sept. 28, 1964, Ser. No. 399,522
4 Claims. (Cl. 116—67)

ABSTRACT OF THE DISCLOSURE

A brake shoe for a disk brake wherein the shoe comprises a metal backing plate having a wearable lining secured to one face thereof. The material of the backing plate, which is made from metal, is sheared to form one or more projections extending toward the working face of the lining. These projections are arranged to engage the braked face of the disk or rotor when the lining has almost worn through and provide an audible signal to the vehicle driver indicating that the brake shoe should be replaced.

---

This invention relates to disk brakes and, more particularly, to signal means for audibly indicating when the friction or brake linings of the brake shoes need replacing.

In disk brakes it is difficult to readily determine the extent or degree of wear on the brake linings and hence these linings may become worn to such an extent as to cause reduced efficiency or brake failure before the worn out condition of the lining is detected.

It is therefore an object of this invention to provide an audible signal which will alert the automobile operator when the brake linings become so worn as to become dangerously thin and need replacement.

The objects of the invention are attained by forming tabs or ears on the backing plate of the brake shoe which project a short distance toward the face of the brake lining. These tabs may be conveniently formed by shearing the metal of the backing plate and bending the sheared portion out of the general plane of the backing plate. These tabs project about .030 to .040 beyond the plane of the backing plate so that when the brake lining has been worn away to a thickness of approximately 1/32 of an inch, the ends of the tabs engage the surface of the brake disk and produce a metal-to-metal scraping sound and thus an audible signal to the driver indicating that the brake lining needs replacing.

Another object of this invention is to provide a device of this type which is so reduced in the number and character of its component parts as to approach the ultimate in structural simplicity, to thereby create an economy in its manufacture, installation and maintenance costs.

The various objects and advantages, and the novel details of construction of one commercially practical embodiment of the invention, will become more apparent as this description proceeds, especially when considered in connection with the accompanying drawings, in which:

FIGURE 1 is a rear elevational view of a brake constructed in accordance with this invention, mounted on a wheel;

FIGURE 2 is an enlarged fragmentary sectional view of a wheel and the brake structure taken substantially on the plane indicated by line 2—2 in FIGURE 1;

FIGURE 3 is a fragmentary sectional view taken substantially on the plane indicated by line 3—3 in FIGURE 1;

FIGURE 4 is an enlarged elevational or plan view of one of the brake shoes;

FIGURE 5 is an elevational view of the top edge of the brake shoe shown in FIGURE 4;

FIGURE 6 is a detail sectional view taken on line 6—6 of FIGURE 4; and

FIGURE 7 is a detail sectional view showing the signal tab engaging the brake disk.

The brake of this invention is illustrated as being associated with a rear vehicle wheel having a rim 10 and a wheel body 11 secured to the axle flange 12 by means of studs or bolt and nut assemblies 13. Being a rear wheel, the flange 12 is secured to and rotates with the axle 14 which extends through a stationary axle housing 15 having a fixed annular flange 16.

Also secured to the axle flange 12, as for instance by means of the studs or bolt and nut assemblies 13, is an annular brake disk 18. The brake disk 18 has a radially inner annular flange 19 by means of which the brake disk is attached to the axle 12, either by the studs or bolt and nut assemblies 13 or by means of bolts 17, or both. The brake disk is in the form of an annular disk and is provided with a pair of opposed brake surfaces 20.

The reference character 25 indicates generally a torque member or spider provided with a radially inner flange 26 which is secured by bolts or the like 27 to the flange 16 of the fixed axle housing 15. Secured to the outer end of the torque member 25 is a caliper-like housing 28 which straddles a portion of the periphery of the brake disk 18 and slidably supports one or more pairs of opposed brake actuating pistons 29, see particularly FIGURE 3. The pistons 29 are slidable in cylinders 30 formed in the caliper-like housing 28. The caliper-like housing member may, as shown in FIGURE 3, be formed of two parts or halves 28a secured together by bolts 30a, as best shown in FIGURE 3. Obviously, one pair of opposed pistons 29 may be employed or more than two pair may be used, if desired. While one type of caliper-like housing and brake actuating pistons are illustrated, it will be obvious that the construction of these parts may be changed, as may be found desirable or expedient.

The reference character 31 indicates a pair of brake shoes, each provided with a metal backing plate 32 and a friction lining 33 adapted to engage the brake surfaces 20 on the brake disk 18. Fluid under pressure may be supplied to the cylinders 30 behind the pistons by means of a fluid pressure supply conduit 34 connected by suitable conduits 35 to the cylinders so that fluid under pressure may be simultaneously supplied to all four pistons, if two pairs of opposed pistons are employed. The reference character 36 indicates a seal for the pistons which, as is customary, is provided for sealing the space between the pistons 29 and the cylinders 30. The brake shoes 31 may be provided with recesses 31a which slidably engage rods 31b to slidably mount the brake shoes on the caliper so that the brake shoes may be actuated by the pistons 29.

When fluid under pressure is admitted into the cylinders 30 behind the pistons 29, they are actuated to move the brake shoes 31 into engagement with the brake surfaces 20 of the brake disk 18, as is customary with disk type brakes. As mentioned heretofore, the particular type of brake disk and the particular construction of the caliper-like housing and pistons may be changed if desired or found expedient.

The present invention relates to means for causing or generating an audible signal when the brake lining 33 has become so worn that it is expedient to again reline the brakes or to provide new brake disks. In order to accomplish this in a simple but effective manner, each backing plate 32 is provided with one or more tabs or ears 40 which may be conveniently formed by shearing the metal of the backing plate 32 and bending the tab or ear out of the general plane of the backing plate, as illustrated best in FIGURES 5 and 6. By forming the tabs 40 in this manner, each is provided with a substantially right angular free end 41 facing in a direction opposite to either direction of rotation of the brake disk 18; i.e., whether the vehicle is being moved forwardly or in the reverse direction. Each tab or ear 40 projects about .030 to .040 inch beyond the plane of the backing plate so that when the brake lining has been worn away to a thickness of approximately 1/32 of an inch, as illustrated in FIGURE 7, the tab or ear will engage the brake disk 18 and will cause a metal-to-metal scraping sound, thus providing an audible signal to the driver that the brake lining 33 needs replacing. By causing the signal to occur when there is approximately 1/32 of an inch of brake lining remaining, these brake linings may be replaced while the brake is still operative to stop the vehicle Obviously, the tabs or ears 40 may be formed in any other suitable manner, it being only necessary that they project sufficiently beyond the backing plate 32 (to which the brake is attached) so as to give an audible signal to the operator prior to complete failure of the brakes. With the arrangement shown, a sharp edge or corner 42 is caused to engage the brake disk 18 which accentuates the metal-to-metal scraping sound. By presenting the tabs 40 in oppositely circumferentially extending directions, the free ends 41 and the corners 42 are oppositely presented to the brake disk 18, irrespective of the direction of rotation of the brake disk. However, these tabs 40 may be arranged so that both extend in the same circumferential direction. Obviously, the tabs or ears 40 may be separately produced and attached to the backing plate 32, but by shearing the backing plate and bending the tabs thus formed out of the plane of the backing plate, the manufacture of these signal devices is quite simplified so that the device of this invention may be economically produced.

As will be apparent from the foregoing description, the objects and advantages of this invention are attained by a construction which is so reduced in the number and character of its component parts as to approach the ultimate simplicity. The simplicity of the device creates an economy in its manufacture, installation and maintenance costs.

While one commercially practical embodiment of the invention has been described and illustrated herein somewhat in detail, it will be understood that various changes may be made as may come within the purview of the accompanying claims.

What is claimed is:

1. A brake shoe for engagement with the disk of a disk brake assembly, said shoe including a metal backing plate having a flat mounting surface and a wearable lining secured to said mounting surface, said lining having a flat working surface for engagement with said disk, said backing plate having a struck out portion defining an integral projection which is radially offset from the area of said lining and which extends toward but terminates short of the plane of the working surface of said lining, whereby said projection will engage said disk after said lining is worn a predetermined amount to give an audible signal of the worn lining condition.

2. The structure set forth in claim 1 in which said brake shoe has two such projections.

3. The structure set forth in claim 1 wherein said projection is inclined in a direction generally circumferentially of the disk and presents a free end which is generally normal to the braked surface of the disk.

4. The structure set forth in claim 3, in which said backing plate has two such projections inclined in generally opposite circumferential directions.

References Cited

UNITED STATES PATENTS

| | | | |
|---|---|---|---|
| 1,875,645 | 9/1932 | Norton | 188—250 |
| 2,398,006 | 4/1946 | Hunt | 188—1 |
| 2,657,772 | 11/1953 | Chamberlain | 188—1 |
| 3,055,456 | 9/1962 | Pfeiffer | 188—73 |
| 3,141,524 | 7/1964 | Mishler | 188—1 |
| 3,168,167 | 2/1965 | Walther | 188—73 |
| 3,190,397 | 6/1965 | Sudres | 188—1 |

LOUIS J. CAPOZI, *Primary Examiner.*